(12) United States Patent
Bae et al.

(10) Patent No.: US 12,260,119 B2
(45) Date of Patent: Mar. 25, 2025

(54) MEMORY SYSTEM INCLUDING MULTIPLE CORES AND METHOD OF OPERATING THE MEMORY SYSTEM

(71) Applicant: SK hynix Inc., Gyeonggi-do (KR)

(72) Inventors: Hyun Woo Bae, Gyeonggi-do (KR); Sang Yong Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 26 days.

(21) Appl. No.: 18/081,688

(22) Filed: Dec. 15, 2022

(65) Prior Publication Data

US 2024/0004578 A1    Jan. 4, 2024

(30) Foreign Application Priority Data

Jul. 1, 2022 (KR) .......... 10-2022-0081479

(51) Int. Cl.
*G06F 3/06* (2006.01)
(52) U.S. Cl.
CPC .......... *G06F 3/0656* (2013.01); *G06F 3/0619* (2013.01); *G06F 3/0679* (2013.01)

(58) Field of Classification Search
CPC ..... G06F 3/0656; G06F 3/0619; G06F 3/0679
See application file for complete search history.

(56) References Cited

U.S. PATENT DOCUMENTS

| | | | |
|---|---|---|---|
| 2015/0254177 A1* | 9/2015 | Ikeda .................... | G06F 3/0647 711/148 |
| 2019/0129876 A1* | 5/2019 | Trika .................... | G06F 3/0683 |
| 2022/0107893 A1* | 4/2022 | Benisty .............. | G06F 12/0868 |
| 2023/0186988 A1* | 6/2023 | Chun ................. | G11C 14/0018 365/185.08 |

FOREIGN PATENT DOCUMENTS

| | | |
|---|---|---|
| KR | 10-2010-0133649 A | 12/2010 |
| KR | 10-2020-0021861 A | 3/2020 |
| KR | 10-2021-0024763 A | 3/2021 |

* cited by examiner

*Primary Examiner* — Edward J Dudek, Jr.
(74) *Attorney, Agent, or Firm* — IP & T GROUP LLP

(57) ABSTRACT

A memory system according to the present technology includes a nonvolatile memory area, a buffer memory area temporarily storing data, and a plurality of cores configured to store, in the nonvolatile memory area, the data stored in the buffer memory area in response to a sudden power off, each of the plurality of cores outputting an interrupt signal indicating that the sudden power off is sensed.

18 Claims, 11 Drawing Sheets

MEMORY SYSTEM INCLUDING MULTIPLE CORES AND METHOD OF OPERATING THE MEMORY SYSTEM

CROSS-REFERENCE TO RELATED APPLICATION

The present application claims priority under 35 U.S.C. § 119(a) to Korean patent application number 10-2022-0081479, filed on Jul. 1, 2022, the entire disclosure of which is incorporated herein by reference.

BACKGROUND

1. Field of Invention

The present disclosure relates to an electronic device, and more particularly, to a memory system and a method of operating a memory controller included in the memory system.

2. Description of Related Art

A memory system is a device that stores data under control of a host device such as a computer or a smartphone. The memory system may include a memory device in which data is stored and a memory controller controlling the memory device. The memory device is divided into a volatile memory device and a nonvolatile memory device.

A semiconductor memory device receives power from an internal or external power supply. When the power supplied from the power supply inside or outside the memory device is suddenly cut off, data stored in the volatile memory device may be lost. In order to solve this problem, quickly storing the data stored in the volatile memory device when a sudden power off (SPO) is sensed is required. That is, quickly performing a power loss protection (PLP) operation is required in preparation for the SPO.

SUMMARY

An embodiment of the present disclosure provides a method of operating a memory controller including a processor having a plurality of cores in a memory system, each capable of sensing a sudden power off in a multi-core environment and performing a dump operation by communicating with each other.

According to an embodiment of the present disclosure, a memory system includes a nonvolatile memory area, a buffer memory area temporarily storing data, and a plurality of cores configured to store, in the nonvolatile memory area, the data stored in the buffer memory area in response to a sudden power off, each of the plurality of cores outputting an interrupt signal indicating that the sudden power off is sensed.

According to an embodiment of the present disclosure, a memory controller includes a power sensor configured to sense a change of external power and provide a power signal of a first state to a processor when the external power is less than a reference value, and the processor including a plurality of cores, each of the plurality of cores independently performing a task according to a priority, and perform a dump operation of storing system data in a nonvolatile memory area in response to a sudden power off.

According to an embodiment of the present disclosure, a memory system includes a plurality of nonvolatile memory areas, a plurality of cores configured to store data in the plurality of nonvolatile memory areas, respectively, wherein a core failed to sense a sudden power off among the plurality of cores is further configured to store the system data in the plurality of nonvolatile memory areas in response to a sudden power off sensed by one of the plurality of cores.

According to the present technology, each core may quickly sense a sudden power off in a multi-core environment, and thus perform a dump operation.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
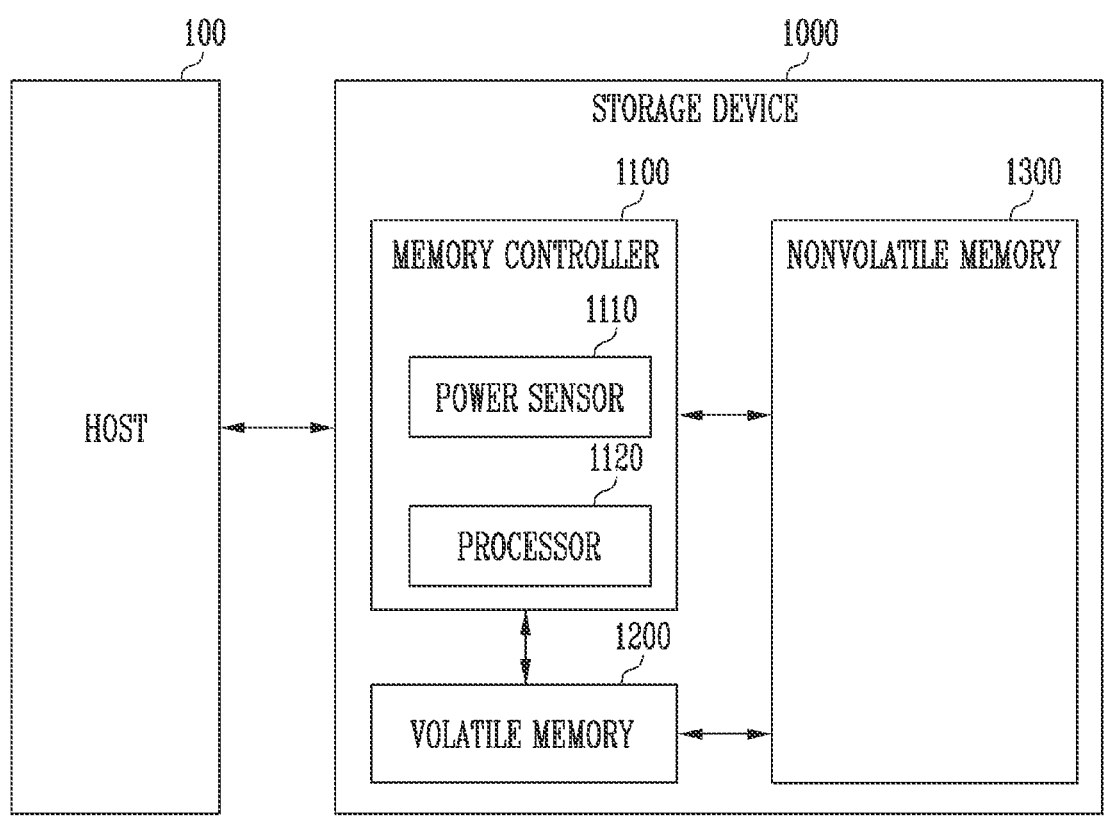
FIG. 1 is a diagram illustrating a memory system according to an embodiment of the present disclosure.

FIG. 1 is a diagram illustrating a memory system according to an embodiment of the present disclosure.

Referring to FIG. 1, a storage device 1000 or a memory system 1000 may include a memory controller 1100, a volatile memory 1200, and a nonvolatile memory 1300.

The memory system 1000 may be a device storing data under control of a host 100, such as a mobile phone, a smart phone, an MP3 player, a laptop computer, a desktop computer, a game machine, a TV, a tablet PC, or an in-vehicle infotainment system.

The memory system 1000 may be manufactured as one of various types of storage devices according to a host interface that is a communication method with the host 100. For example, the memory system 1000 may be configured as any of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The memory system 1000 may be manufactured as any of various types of packages. For example, the memory system 1000 may be manufactured as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The host 100 may communicate with the memory system 1000 using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The nonvolatile memory 1300 may store data. The nonvolatile memory 1300 may operate in response to control of the memory controller 1100.

The nonvolatile memory 1300 may include a memory cell array including a plurality of memory cells storing data. The memory cell array may include a plurality of memory blocks. Each memory block may include a plurality of memory cells. One memory block may include a plurality of pages. In an embodiment, the page may be a unit for storing data in the nonvolatile memory 1300 or reading data stored in the nonvolatile memory 1300. In an embodiment, the nonvolatile memory 1300 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, the nonvolatile memory 1300 is a NAND flash, but is not limited thereto. A configuration corresponding to a nonvolatile memory area may correspond to the nonvolatile memory 1300.

In an embodiment, the nonvolatile memory 1300 may be implemented as a three-dimensional array structure. The present disclosure may be applied not only to a flash memory device in which a charge storage layer is configured of a conductive floating gate (FG), but also to a charge trap flash (CTF) in which a charge storage layer is configured of an insulating layer.

In an embodiment, each of the memory cells included in the nonvolatile memory 1300 may be configured as a single level cell (SLC) that stores one data bit, a multi-level cell (MLC) that stores two data bits, a triple level cell (TLC) that stores three data bits, or a quad level cell (QLC) that stores four data bits.

The nonvolatile memory 1300 may be configured to receive a command and an address from the memory controller 1100, and to access an area selected by the address in the memory cell array. That is, the nonvolatile memory 1300 may perform an operation corresponding to the command on the area selected by the address. For example, the nonvolatile memory 1300 may perform a write operation (program operation), a read operation, and an erase operation. During the program operation, the nonvolatile memory 1300 may program data in the area selected by the address. During the read operation, the nonvolatile memory 1300 may read data from the area selected by the address. During the erase operation, the nonvolatile memory 1300 may erase data stored in the area selected by the address.

The memory controller 1100 may control an overall operation of the memory system 1000.

When power is applied to the memory system 1000, the memory controller 1100 may execute firmware (FW). When the nonvolatile memory 1300 is a flash memory device, the memory controller 1100 may execute firmware such as a flash translation layer (FTL) for controlling communication between the host 100 and the nonvolatile memory 1300.

In an embodiment, the memory controller 1100 may receive data and a logical block address (LBA) from the host 100, and may convert the LBA into a physical block address (PBA) indicating an address of the memory cells included in the nonvolatile memory device 1300, in which data is to be stored. In addition, the memory controller 1100 may store a logical-physical address mapping table configuring a mapping relationship between the LBA and the PBA in the volatile memory 1200.

The memory controller 1100 may control the nonvolatile memory 1300 to perform the program operation, the read operation, the erase operation, or the like according to a request of the host 100. During the program operation, the memory controller 1100 may provide a program command, the LBA, and data to the nonvolatile memory 1300. During the read operation, the memory controller 1100 may provide a read command and the LBA to the nonvolatile memory 1300. During the erase operation, the memory controller 1100 may provide an erase command and the LBA to the nonvolatile memory 1300.

The memory controller 1100 may control data exchange between the host 100 and the nonvolatile memory 1300. In addition, the memory controller 1100 may temporarily store system data for control of the nonvolatile memory 1300 in the volatile memory 1200. For example, the memory controller 1100 may temporarily store data input from the host 100 in the volatile memory 1200, and then transmit the data temporarily stored in the volatile memory 1200 to the nonvolatile memory 1300.

In various embodiments, the volatile memory 1200 may be used as an operation memory or a cache memory of the memory controller 1100. The volatile memory 1200 may store codes or commands executed by the memory controller 1100. In addition, the volatile memory 1200 may store data processed by the memory controller 1100.

In an embodiment, the volatile memory 1200 may be implemented as a dynamic random access memory (DRAM) such as a double data rate synchronous dynamic random access memory (DDR SDRAM), a DDR4 SDRAM, a low power double data rate4 (LPDDR4) SDRAM, a graphics double data rate (GDDR) SDRAM, a low power DDR (LPDDR), or a Rambus dynamic random access memory (RDRAM), or a static random access memory (SRAM).

In various embodiments, the memory system 1000 may not include the volatile memory 1200. In this case, volatile memories outside the memory system 1000 may serve as the volatile memory 1200.

Referring to FIG. 1, the memory controller 1100 may include a power sensor 1110 and a processor 1120. The power sensor 1110 may monitor a level of power applied from an outside. In an embodiment, the processor 1120 may configured of cores that perform an operation to control the nonvolatile memory 1300. The number of cores configuring the processor 1120 may vary according to design. A processor including one core may be a single-core processor. A processor including two or more cores may be a multi-core processor.

For convenience of description, it has been described that the power sensor 1110 and the processor 1120 including the plurality of cores is included in the memory controller 1100, but the present disclosure is not limited thereto. A configuration corresponding to a configuration controlling the nonvolatile memory area may correspond to the processor 1120. Similarly, the power sensor 1110 that senses power and outputs a power signal according to a change of the power is also not limited to an internal configuration of the memory controller 1100.

Figure 2:
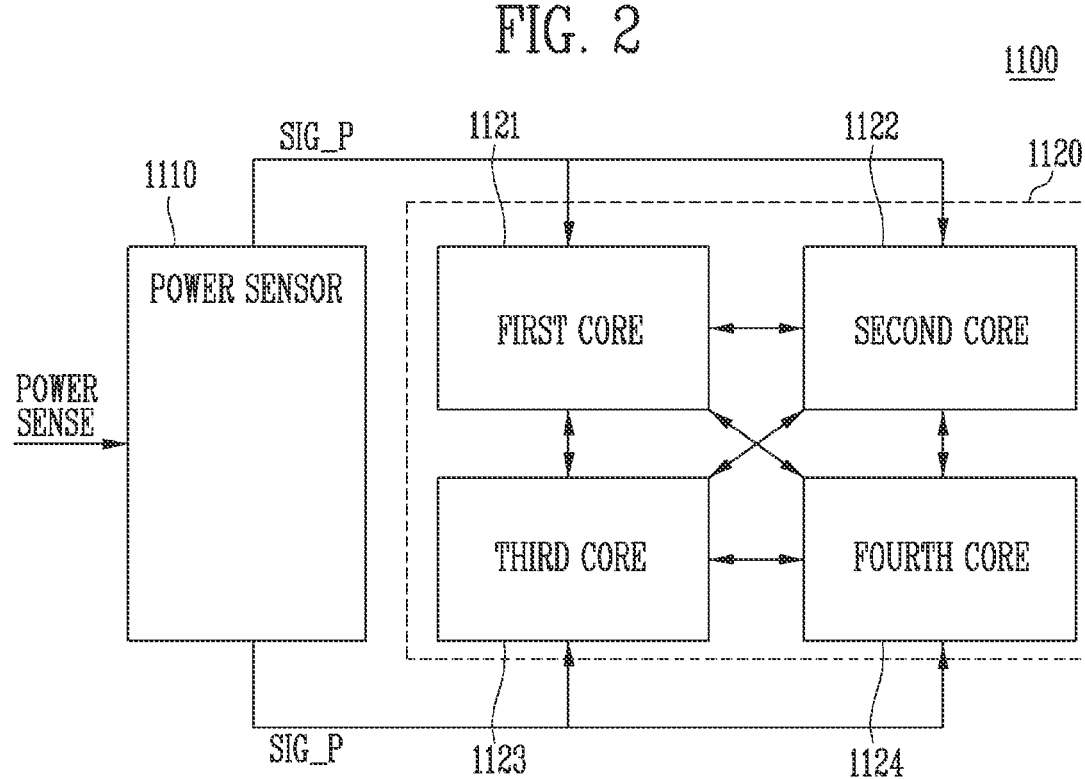
FIG. 2 is a diagram illustrating a memory controller according to an embodiment of the present disclosure.

FIG. 2 is a diagram illustrating a memory controller according to an embodiment of the present disclosure.

Referring to FIG. 2, the memory controller 1100 of FIG. 1 may include the power sensor 1110 and the processor 1120 including four cores.

The power sensor 1110 may provide a power signal SIG_P of a first state (e.g., a logic high level) to the processor 1120 when external power is stably applied while continuously monitoring the level of the power applied from the outside. In addition, when the power applied from the outside becomes less than a specific reference value, the power sensor 1110 may provide the power signal SIG_P of a second state (e.g., a logic low level) to the processor 1120. The reference value may vary according to design, and may be a reference voltage that determines a sudden power off.

The processor 1120 may be a quad-core processor including a first core 1121, a second core 1122, a third core 1123, and a fourth core 1124. For convenience of description, the processor 1120 has four cores, but the present disclosure is not limited thereto, and it is sufficient that the processor may be a multi-core processor.

The processor 1120 may drive firmware through each of the cores and control the nonvolatile memory 1300 of FIG. 1. At this time, areas inside the nonvolatile memory 1300 controlled by each of the cores may be different from each other. That is, among the areas inside the nonvolatile memory 1300, two or more cores may not control one area.

In addition, the respective cores inside the processor 1120 may be independent of each other. Each of the cores may independently perform a task without being affected by tasks performed by other cores. For example, the second core may perform the task input to the second core regardless of a start and an end of the task which is being performed by the first core. Through this, performance of a parallel task is possible, thereby improving performance of the processor 1120.

A core of an idle state may be a core of a state in which the core does not perform the task. A core of a run state may be a core of a state in which the core is performing the task. Each of the cores may sequentially process received commands according to a priority.

For example, the task performed by each core may be a task in which task continuity is required to be guaranteed. A core performing the task of which the continuity is required to be guaranteed may not perform another task until the core completes the current performing task even though a command to perform another task is input. In addition, when performing the task of which the continuity is required to be guaranteed, another command or signal may not be recognized.

Similarly, the task performed by each core may be a task of which continuity is not required to be guaranteed. When a command for the task of which continuity is required to be guaranteed or a task having a priority higher than that of the current performing task is input to a core performing the task of which continuity is not required to be guaranteed, the core may stop the currently performing task and first perform the task of which continuity is required to be guaranteed or a task having a high priority. In an embodiment, a dump operation may be a task having a high priority for reliability of a memory device.

Each of the cores may sense the sudden power off based on the power signal SIG_P provided by the power sensor 1110. When the sudden power off occurs, data stored in the volatile memory area 1200 shown in FIG. 1 may be lost. Therefore, when the sudden power off occurs, quickly sensing this and performing the dump operation of storing, in the nonvolatile memory 1300, the data stored in the volatile memory 1200 are required. When the memory system 1000 of FIG. 1 operates, since the system data stored in the nonvolatile memory 1300 is temporarily stored in the volatile memory 1200 and used, the continuously updated system data is required to be quickly stored in the nonvolatile memory 1300. The system data may be configuration data essential for the memory controller 1100 of FIG. 1 to control the nonvolatile memory 1300.

The system data may include mapping data (MAP_DATA) including the mapping relationship between the LBA and the PBA, host data (HOST_DATA) including booting related information and user related information, user related data (USER_DATA), and firmware related data (FW_DATA). The booting related information may include boot loader and boot related information, and the user related information may include information on a replaced protected memory block (RPMB) and a write protection (permanent write protect persist within next power on, WP).

The firmware related data (FW_DATA) may be a firmware system algorithm and may include configuration information related to a memory device, hardware register information, and FTL related information.

The mapping related data (MAP_DATA) may include at least one of a map index (Map Index), map tables (Map T1 to T5), map conversion (Map P2L), and temporary map (Map temp P2L) information. The map index includes a position of map related information, and the map table includes map data information of an actual memory device. The map conversion and temporary map information includes information between the PBA and the LBA.

The first core 1121, the second core 1122, the third core 1123, and the fourth core 1124 inside the processor 1120 may communicate with each other. Each of the cores may sense the sudden power off based on the power signal SIG_P provided by the power sensor 1110, and the core sensing the sudden power off may provide information on occurrence of the sudden power off to the remaining cores.

For example, when the first core 1121 is in the idle state, the first core 1121 may immediately recognize the power signal SIG_P provided by the power sensor 1110, and may sense the sudden power off based on the power signal SIG_P. When it is determined that the sudden power off is valid, the first core 1121 may provide the information on the occurrence of the sudden power off to the second core 1122, the third core 1123, and the fourth core 1124.

Similarly, the core performing the task of which continuity is not required to be guaranteed may immediately recognize the power signal SIG_P provided by the power sensor 1110 and sense the sudden power off based on the power signal SIG_P. When it is determined that the sudden power off is valid, the first core 1121 may provide the information on the occurrence of the sudden power off to the second core 1122, the third core 1123, and the fourth core 1124.

In contrast, when it is determined that the sudden power off is invalid, the respective cores may not provide the information on the occurrence of the sudden power off to other cores. In this case, the plurality of cores may continuously perform the tasks which are being performed, respectively.

In an embodiment, the first core 1121 sensing the sudden power off may provide the information on the occurrence of the sudden power off to the second core 1122, the third core 1123, and the fourth core 1124, and then immediately perform the dump operation. The first core 1121 may control the nonvolatile memory 1300 to store, in an area inside the nonvolatile memory 1300 of FIG. 1 controlled by the first core 1121, the data stored in the volatile memory 1200.

In an embodiment, the second core 1122, the third core 1123, and the fourth core 1124 receiving the information on the occurrence of the sudden power off from the first core 1121 may perform the dump operation in response to the information on the occurrence of the sudden power off. At this time, the information on the occurrence of the sudden power off may include an interrupt signal for stopping the task, which is being performed by other cores, and performing the dump operation. The second core 1122, the third core 1123, and the fourth core 1124 may control the nonvolatile memory 1300 to store, in an area inside the nonvolatile memory 1300 of FIG. 1 controlled by each of the cores, the data stored in the volatile memory 1200 in response to the interrupt signal.

For example, a plurality of cores performing the task of which continuity is not required to be guaranteed may stop the task, which is being performed, in response to the interrupt signal provided by the core sensing the sudden power off, and preferentially perform the dump operation.

For example, a plurality of cores performing the task of which continuity is required to be guaranteed may sense the interrupt signal provided by the core sensing the sudden power off, and perform the dump operation when the task of which continuity is required to be guaranteed is ended.

Each of the plurality of cores may sense the sudden power off, and communicate with each other to quickly perform the dump operation in response to the sudden power off. That is, it may be guaranteed that when a core performs the dump operation, a plurality of other cores also perform the dump operation.

Figure 3:
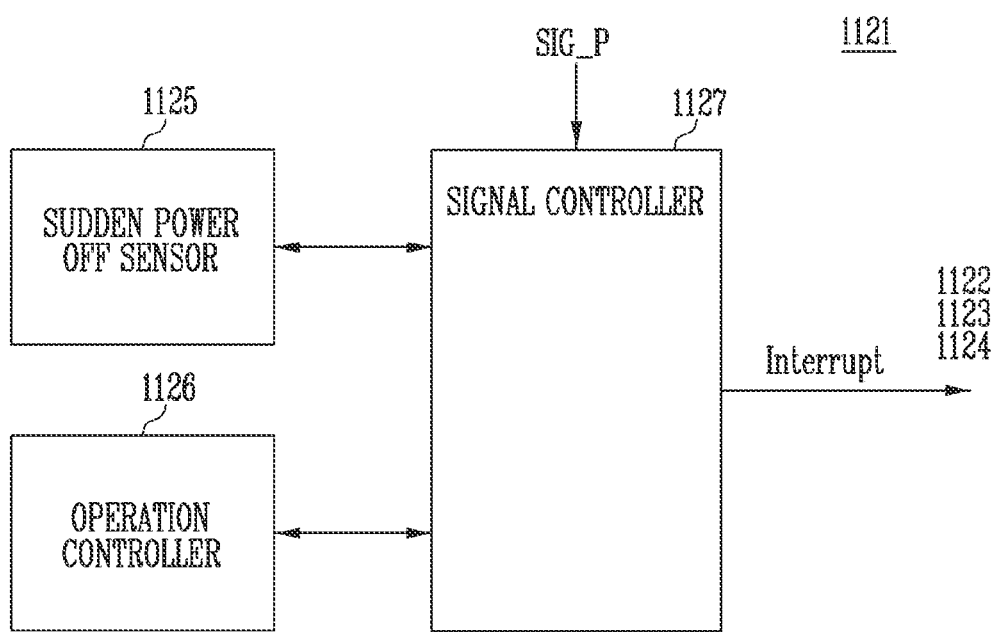
FIG. 3 is a diagram illustrating a core according to an embodiment of the present disclosure.

FIG. 3 is a diagram illustrating a core according to an embodiment of the present disclosure.

Referring to FIG. 3, the first core 1121 among the plurality of cores inside the processor 1120 of FIG. 2 may include a sudden power off sensor 1125, an operation controller 1126, and a signal controller 1127.

The signal controller 1127 may receive the power signal SIG_P provided by the power sensor 1110 of FIG. 2. As described in the description of FIG. 2, the power sensor 1110 may continuously monitor the power applied from the outside, and may output the power signal SIG_P of the high state when the power applied from the outside is maintained at a reference value or higher. In addition, when the power applied from the outside is decreased to a value less than the reference value, the power sensor 1110 may output the power signal SIG_P of the low state. The signal controller 1127 may receive the power signal SIG_P output from the power sensor 1110 of FIG. 2 and provide the power signal SIG_P to the sudden power off sensor 1125.

The sudden power off sensor 1125 may determine the occurrence of the sudden power off based on the power signal SIG_P provided by the signal controller 1127. As will be described in detail with the description of FIG. 4, when the sudden power off sensor 1125 determines that the sudden power off is valid based on the power signal SIG_P of the low state, the sudden power off sensor 1125 may provide information indicating that the sudden power off is valid to the signal controller 1127. In addition, when the sudden power off sensor 1125 determines that the sudden power off is invalid based on the power signal SIG_P of the low state, the sudden power off sensor 1125 may provide information indicating that the sudden power off is invalid to the signal controller 1127.

The operation controller 1126 may control performing the task. A request for the task input to each of the cores may be performed by the operation controller 1126.

When the signal controller 1127 receives the information indicating that the sudden power off is valid from the sudden power off sensor 1125, the signal controller 1127 may provide the information indicating the occurrence of the sudden power off to the second core 1122, the third core 1123, and the fourth core 1124. The information indicating the occurrence of the sudden power off may include the interrupt signal provided to other cores to perform the dump operation. A signal controller (not shown) of the second core 1122, a signal controller (not shown) of the third core 1123, and a signal controller (not shown) of the fourth core 1124 may receive the interrupt signal provided by the signal controller 1127 of the first core 1121.

When the signal controller 1127 receives the information that the sudden power off is valid from the sudden power off sensor 1125, the signal controller 1127 may provide the information on the occurrence of the sudden power off to the operation controller 1126. When it is determined that a sudden power off occurs, the operation controller 1126 may perform the dump operation.

A signal controller (not shown) of the second core, a signal controller (not shown) of the third core, and a signal controller (not shown) of the fourth core receiving the information indicating the occurrence of the sudden power off provided by the signal controller 1127 of the first core may provide the information on the occurrence of sudden power off to an operation controller (not shown) of the second core, an operation controller (not shown) of the third core, and an operation controller (not shown) of the fourth core. The operation controllers (not shown) included in respective cores may respectively perform the dump operation based on the information on the occurrence of the sudden power off provided by the signal controllers (not shown) included in each core.

For convenience of description, the first core 1121 has been described as a reference, but the second core 1122, the third core 1123, and the fourth core 1124 may also be designed having the same structure as the first core 1121.

Figure 4:
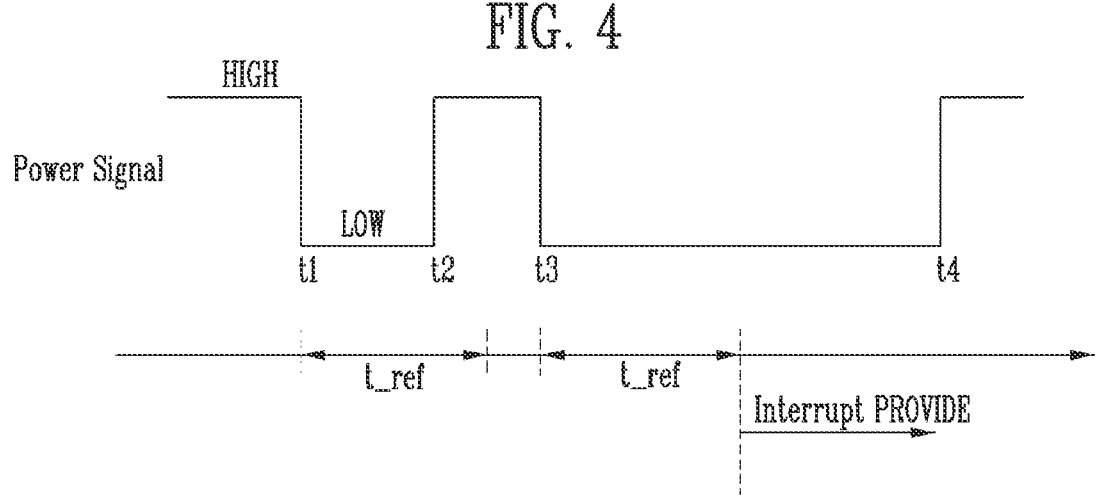
FIG. 4 is a diagram illustrating a criterion for determining occurrence of a sudden power off when a power drop is sensed according to an embodiment of the present disclosure.

FIG. 4 is a diagram illustrating a criterion for determining an occurrence of a sudden power off when a power drop is sensed according to an embodiment of the present disclosure.

Referring to FIG. 4, a method of sensing the sudden power off by the sudden power off sensor included in each of the cores according to a change of the power signal SIG_P provided by the power sensor 1110 of FIG. 2 is shown.

As described with reference to FIG. 3, the sudden power off sensor 1125 of FIG. 3 may receive the power signal SIG_P from the signal controller 1127. The power signal SIG_P may be changed according to the power applied from the outside. The power sensor 1110 of FIG. 2 may output the power signal SIG_P of the high state when the power applied from the outside is equal to or greater than the reference value, and may output the power signal SIG_P of the low state when the power applied from the outside is less than the reference value.

The sudden power off may be a state in which the power signal SIG_P of the low state is input to the sudden power off sensor 1125 during a reference time t_ref. The reference time t_ref may be a preset value and may vary according to a capacity of auxiliary power of the memory system.

The power signal SIG_P input according to a passage of time may be input in a low state between t1 to t2. The sudden power off sensor 1125 may compare the reference time t_ref with t2-t1, which is an interval when the power signal SIG_P of the low state is input. As indicated by an arrow, since the interval t2-t1 is shorter than the reference time t_ref, it may be determined that the sudden power off is invalid. This is because the dump operation is prevented from being immediately performed when the power is less than the reference value because the power applied from the outside may be changed according to a situation.

The power signal SIG_P input according to the passage of time may be input in the high state between t2 and t3. In this case, the power applied from the outside may be maintained constant. In addition, in this case, the power applied from the outside may be continuously changed, but may be changed at a value equal to or greater than the reference value when the sudden power off is not a concern.

As time passes, the power signal SIG_P of the low state may be input again from t3. The sudden power off sensor 1125 may determine whether the power signal of the low state is input during the reference time t_ref from the time point t3 when the power signal SIG_P of the low state is input. When the reference time t_ref has elapsed from the time point t3, the sudden power off sensor 1125 may determine that the sudden power off is valid. When it is determined that the sudden power off is valid, the sudden power off sensor 1125 may provide the information that the sudden power off is valid as described with reference to FIG. 3. The reference time t_ref may be a minimum time for quickly performing the dump operation in response to the sudden power off. Therefore, even though the power signal SIG_P of the low state is continuously input from the reference time t_ref has elapsed from the time point t3 to a time point t4, the information indicating the sudden power off is valid may be provided to the signal controller 1127 immediately at a time point when the reference time t_ref has elapsed from the time point t3. At this point in time, the signal controller 1127 will immediately provide. In response to this, the signal controller 1127 may provide the information on the occurrence of the sudden power off including the interrupt signal to the signal controllers of the other cores.

Figure 5:
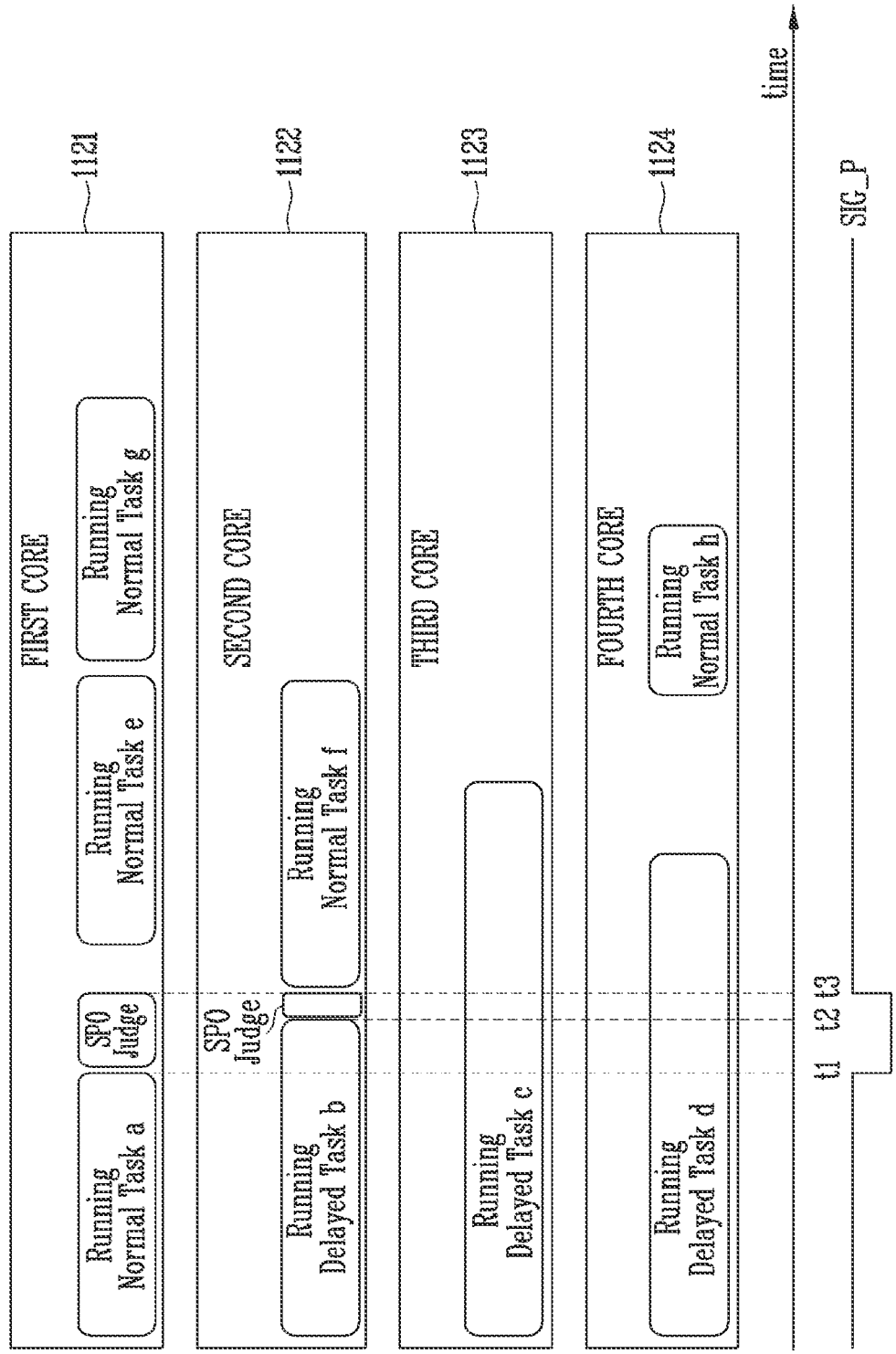
FIG. 5 is a diagram illustrating an operation of each of the cores when a sudden power off is not sensed according to an embodiment of the present disclosure.

FIG. 5 is a diagram illustrating an operation of each of the cores when a sudden power off is not sensed according to an embodiment of the present disclosure.

Referring to FIG. 5, an operation of the plurality of cores according to the power signal SIG_P input according to the passage of time is shown.

From before t1, the first core 1121 may be performing a normal task (Normal Task a), the second core 1122 may be performing a delayed task (Delayed Task b), the third core 1123 may be performing a delayed task (Delayed Task c), and the fourth 1124 may be performing a delayed task (Delayed Task d). As described above in the description of FIG. 2, the normal task (Normal Task) may be in a state in which the task of which continuity is not required to be guaranteed is being performed. Since the delayed task (Delayed Task) may be in a state in which the task of which continuity is required to be guaranteed is being performed, the delayed task (Delayed Task) may be in a state in which a request for a new task or another signal may not be recognized. In addition, the task of determining whether the power signal SIG_P of the low state is input and whether the sudden power off occurs may be a task having a priority higher than that of the normal task (Normal Task). That is, when the power signal SIG_P of the low state is input, the core performing the normal task (Normal Task) may immediately determine whether the sudden power off is valid.

From the time point t1, when the power signal SIG_P of the low state is input the first core 1121 may recognize the power signal SIG_P of the low state and determine whether the sudden power off is valid (SPO Judge). The sudden power off may be a state in which the power signal of the low state is input during the reference time t_ref. Since each core may independently perform the task, the second core 1122 may recognize the power signal SIG_P of the low state from a time point t2 after performing the delayed task (Delayed Task b). The second core 1122 may determine whether the sudden power off is valid based on the power signal SIG_P of the low state recognized from the time point t2 (SPO Judge). At this time, since the third core 1123 and the fourth core 1124 are respectively performing the delayed tasks (Delayed Task c and Delayed Task d), the third core 1123 and the fourth core 1124 may not recognize the power signal SIG_P of the low state.

The first core 1121 may determine whether the power signal SIG_P of the low state is input during the reference time t_ref from the time point t1. The second core 1122 may determine whether the power signal SIG_P of the low state is input during the reference time from the time point t2. When a difference from the time point t3 when the power signal SIG_P of the high state is input to the time point t1 is less than the reference time t_ref, the first core 1121 may determine that the sudden power off is invalid.

Similarly, when a difference from the time point t3 when the power signal SIG_P of the high state is input to the time point t2 is less than the reference time t_ref, the second core 1122 determines that the sudden power off is invalid. That is, the first core 1121 and the second core 1122 may not provide the information on the occurrence of the sudden power off including the interrupt signal to the other cores because the sudden power off is invalid and the dump operation is not required to be performed.

Since the power signal SIG_P of the high state is input, that is, the power applied from the outside is stably maintained, from the time point t3, each of the cores may perform an assigned task. The first core 1121 may process a normal task (Normal Task e) and a normal task (Normal Task g) in order. The second core 1122 may perform a normal task (Normal Task f).

At the time points t1 to t3, since the third core 1123 and the fourth core 1124 are performing the delayed tasks (Delayed Task c and Delayed Task d), the third core 1123 and the fourth core 1124 may not recognize the power signal SIG_P of the low state. However, since the third core 1123 and the fourth core 1124 does not receive a separate interrupt signal from the first core 1121 and the second core 1122, the third core 1123 and the fourth core 1124 may continuously perform the delayed tasks (Delayed Task c and Delayed Task d). Thereafter, the fourth core 1124 may perform an assigned normal task (Normal Task h).

Figure 6:
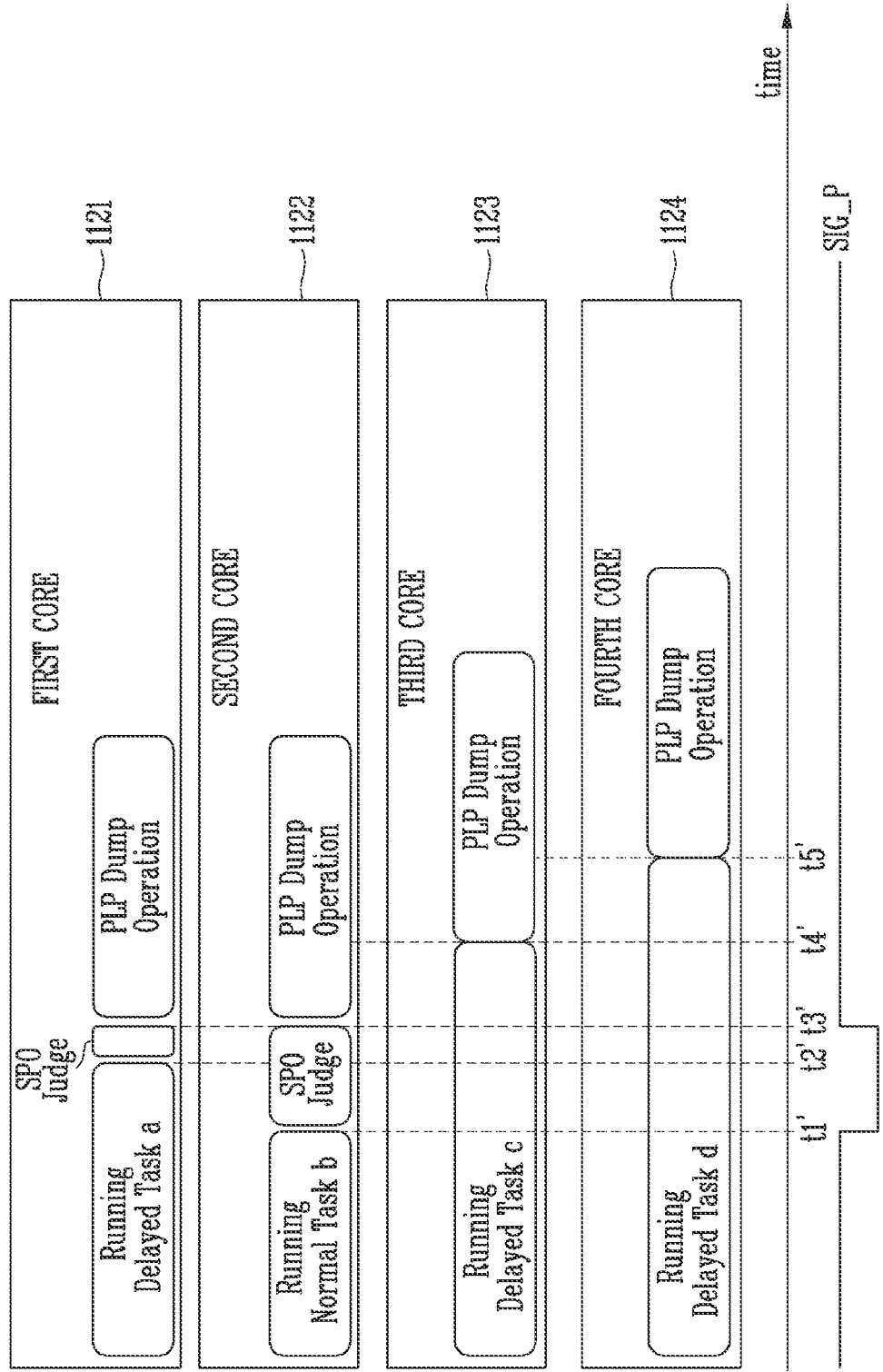
FIG. 6 is a diagram illustrating an operation of other cores when a core senses a sudden power off according to an embodiment of the present disclosure.

FIG. 6 is a diagram illustrating an operation of other cores when a core senses a sudden power off according to an embodiment of the present disclosure.

Referring to FIG. 6, a process of performing the dump operation by the second core 1122 sensing the valid sudden power off is shown.

From before a time point t1', the first core 1121 may be performing a delayed task (Delayed Task a), the second core 1122 may be performing a normal task (Normal Task b), the third core 1123 may be performing a delayed task (Delayed Task c), and the fourth 1124 may be performing a delayed task (Delayed Task d). As described with reference to FIG. 5, the normal task (Normal Task) may be in a state in which the task of which continuity is not required to be guaranteed is being performed. Since the delayed task (Delayed Task) may be in a state in which the task of which continuity is required to be guaranteed is being performed, the delayed task (Delayed Task) may be in a state in which a request for a new task or another signal may not be recognized. In addition, the task of determining whether the power signal SIG_P of the low state is input and whether the sudden power off occurs may be a task having a priority higher than that of the normal task (Normal Task). That is, when the power signal SIG_P of the low state is input, the core performing the normal task (Normal Task) may immediately determine whether the sudden power off is valid.

From the time point t1', when the power signal SIG_P of the low state is applied, since the first core 1121, the third core 1123, and the fourth core 1124 are performing the delayed tasks (Delayed Task a, Delayed Task c, and Delayed Task d), the first core 1121, the third core 1123, and the fourth core 1124 may not recognize the power signal SIG_P of the low state. In contrast, the second core performing the normal task (Normal Task b) may recognize the power signal SIG_P of the low state from the time point t1', and determine whether the power signal SIG_P of the low state is input during the reference time t_ref, that is, whether the sudden power off is valid (SPO Judge). The first core 1121, which has completed all of the delayed task (Delayed Task a), may also recognize the power signal SIG_P of the low state from a time point t2', and determine whether the sudden power off is valid from the time point t2' (SPO Judge).

When t3'-t1', which is a time interval from t1' to t3', is equal to the reference time t_ref, the second core 1122 may determine that the sudden power off is valid. The second core 1122 determining that the sudden power off is valid may perform a power loss protection (PLP) dump operation from a time point t3'. In addition, the second core 1122 may provide the information on the occurrence of the sudden power off to the first core 1121, the third core 1123, and the fourth core 1124. At this time, the information on the occurrence of the sudden power off may include an interrupt signal for performing the PLP dump operation.

The first core 1121, the third core 1123, and the fourth core 1124 may perform the PLP dump operation in response to the information on the occurrence of the sudden power off provided by the second core 1122. Specifically, the first core 1121 may perform the PLP dump operation from the time point t3' in response to the information on the occurrence of the sudden power off provided by the second core 1122. The third core 1123 and the fourth core 1124 may perform the PLP dump operation from a time point t4' and a time point t5' when the respective delayed tasks (Delayed Task c and Delayed Task d) are ended, based on the information on the occurrence of the sudden power off provided by the second core 1122. The PLP dump operation may be an operation of storing data stored in a volatile memory area in a nonvolatile memory area. At this time, nonvolatile memory areas controlled by the respective cores may be different areas. That is, the first core 1121 to the fourth core 1124 may store, in different areas within the nonvolatile memory area, data stored in the volatile memory area, respectively. The data stored in the volatile memory area may include system data.

Even though the power signal SIG_P of the high state is input after the time point t3', the plurality of cores may continuously perform the PLP dump operation. When the PLP dump operation is completed, power of the memory system may be turned off for a stable operation of the memory system. As described above, even though the first core 1121 recognizes the power signal SIG_P of the low state of a time interval shorter than the reference time t_ref and may not determine that the sudden power off is valid, and the third core 1123 and the fourth core 1124 performing the delayed tasks (Delayed Task c and Delayed Task d) may not determine that the sudden power off is valid, the first core 1121, the third core 1123, and the fourth core 1124 may perform the PLP dump operation by the interrupt signal provided by the second core 1122.

In addition, the core sensing the sudden power off may not return to an operation state after performing the PLP dump operation. That is, after performing the PLP dump operation, neither the normal task (Normal Task) nor the delayed task (Delayed Task) may be performed. Therefore, any core sensing the sudden power off and determining that the PLP dump operation is required to be performed may provide an auxiliary signal such as the interrupt signal to cause the cores which do not sense the sudden power off to perform the PLP dump operation, thereby improving reliability of a system.

For convenience of description, an embodiment in which the second core 1122 effectively senses the sudden power off is described, but the present disclosure is not limited thereto. The first core 1121, the third core 1123, and the fourth core 1124 may also effectively sense the sudden power off according to the task which is being performed.

Figure 7:
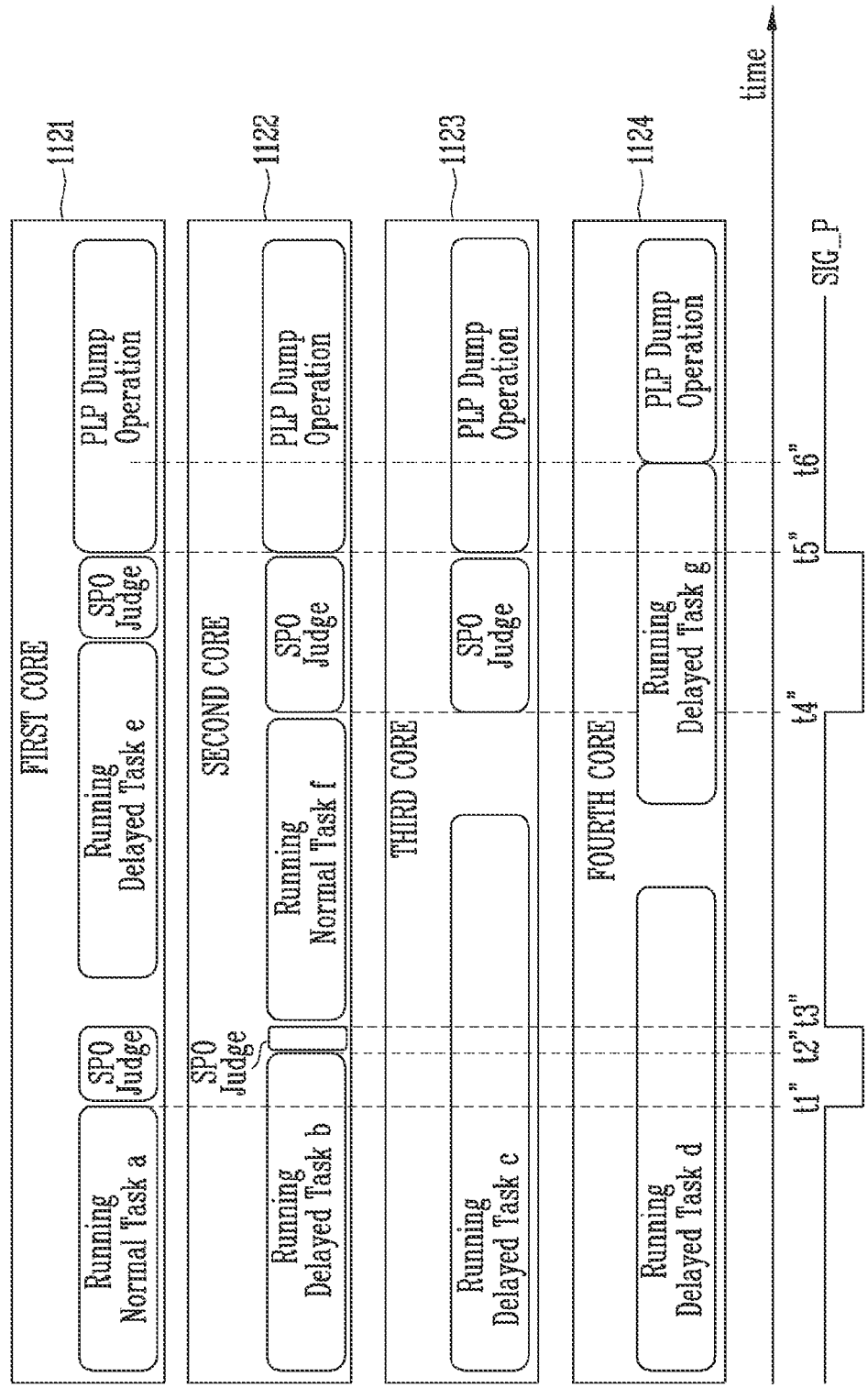
FIG. 7 is a diagram illustrating an operation of other cores when a plurality of cores simultaneously sense a sudden power off according to an embodiment of the present disclosure.

FIG. 7 is a diagram illustrating an operation of other cores when a plurality of cores simultaneously sense a sudden power off according to an embodiment of the present disclosure.

Referring to FIG. 7, a process in which the plurality of cores simultaneously sense the valid sudden power off and performs the PLP dump operation is shown.

From before a time point t1", the first core 1121 may be performing a normal task (Normal Task a), the second core 1122 may be performing a delayed task (Delayed Task b), the third core 1123 may be performing a delayed task (Delayed Task c), and the fourth 1124 may be performing a delayed task (Delayed Task d). As described with reference to FIG. 5, the normal task (Normal Task) may be in a state in which the task of which continuity is not required to be guaranteed is being performed. Since the delayed task (Delayed Task) may be in a state in which the task of which continuity is required to be guaranteed is being performed, the delayed task (Delayed Task) may be in a state in which a request for a new task or another signal may not be recognized. In addition, the task of determining whether the power signal SIG_P of the low state is input and whether the sudden power off occurs may be a task having a priority higher than that of the normal task (Normal Task). That is, when the power signal SIG_P of the low state is input, the core performing the normal task (Normal Task) may immediately determine whether the sudden power off is valid.

From the time point t1" when the power signal SIG_P of the low state is input, the first core 1121 performing the normal task (Normal Task a) may determine whether the power signal SIG_P of the low state is input during the reference time t_ref from the time point t1". That is, it may be determined whether the sudden power off is valid (SPO Judge).

The second core 1122, completing performance of the delayed task (Delayed Task b) of which continuity is required to be guaranteed at a time point t2", may recognize the power signal SIG_P of the low state from the time point t2", and determine whether the sudden power off is valid (SPO Judge).

When t3"-t1", which is a time interval until t3" when the power signal SIG_P of the high state is input, is shorter than the reference time t_ref, the first core 1121 may determine that the sudden power off is invalid. Similarly, when t3"-t2", which is a time interval until t3" when the power signal SIG_P of the high state is input, is shorter than the reference time t_ref, the second core 1122 may determine that the sudden power off is invalid.

When it is determined that the sudden power off is invalid, the first core 1121 and the second core 1122 may not provide the interrupt signal for causing the other cores to perform the PLP dump operation. Similarly, the first core 1121 may perform a delayed task (Delayed Task e) assigned to the first core 1121, and the second core 1122 may perform a normal task (Normal Task f) assigned to the second core 1122.

From a time point t4" when the power signal SIG_P of the low state is input again, each core may sense the power signal SIG_P of the low state according to a state of the currently being performed task. That is, since the first core 1121 and the fourth core 1124 are performing the delayed tasks (Delayed Task e and Delayed Task g), the first core 1121 and the fourth core 1124 may not sense the power signal SIG_P of the low state.

From a time point t4" when the power signal SIG_P of the low state is input, the second core 1122 may stop the normal task (Normal Task f) which is being performed, and determine whether the sudden power off is valid (SPO Judge). The third core 1123 in the idle state may also determine whether the sudden power off is valid from the time t4" (SPO Judge). Thereafter, the first core 1121 completing the delayed task (Delayed Task e) may determine whether the sudden power off is valid from a time point when the delayed task (Delayed Task e) is completed (SPO Judge).

When t5"-t4", which is a time interval until t5" when the power signal SIG_P of the high state is input, is the reference time t_ref, the second core 1122 may determine that the sudden power off is valid. Similarly, the third core 1123 may also determine that the sudden power off is valid. On the other hand, the first core 1121 starting to determine whether the sudden power off is valid later than the second and third cores (SPO Judge) may determine that the sudden power off is invalid.

The second core 1122 determining that the sudden power off is valid may immediately perform the PLP dump operation. In addition, the second core 1122 may provide the information on the occurrence of the sudden power off to the first core 1121, the third core 1123, and the fourth core 1124. The information on the occurrence of the sudden power off may include the interrupt signal for performing the PLP dump operation.

The third core 1123 determining that the sudden power off is valid may immediately perform the PLP dump operation. In addition, the third core 1123 may provide the information on the occurrence of the sudden power off to the first core 1121, the second core 1122, and the fourth core 1124. The information on the occurrence of the sudden power off may include the interrupt signal for performing the PLP dump operation.

In response to the information on the occurrence of sudden power off provided by the second core 1122 and the third core 1123, the first core 1121 may perform the PLP dump operation. Similarly, in response to the information on the occurrence of the sudden power off provided by the second core 1122 and the third core 1123, the fourth core 1124 may perform the PLP dump operation after t6" when the delayed task (Delayed Task g) is completed. The PLP dump operation may be an operation of storing data stored in a volatile memory area in a nonvolatile memory area. At this time, nonvolatile memory areas controlled by the respective cores may be different areas. That is, the first core 1121 to the fourth core 1124 may store, in different areas within the nonvolatile memory area, data stored in the volatile memory area, respectively. The data stored in the volatile memory area may include the system data. For a stable operation of the memory system, the power of the memory system may be turned off after a time point when the PLP dump operation is completed.

In addition, even though the power signal SIG_P of the high state is input after the time point t5" when it is determined that the sudden power off is valid, the PLP dump operation may be performed. As described above, even though the first core 1121 recognizes the power signal SIG_P of the low state of a time interval shorter than the reference time t_ref and may not determine that the sudden power off is valid, and the fourth core 1124 performing the delayed task (Delayed Task g) may not determine that the sudden power off is valid, the first core 1121 and the fourth core 1124 may perform the PLP dump operation by the interrupt signal provided by the second core 1122 and the third core 1123.

Figure 8:
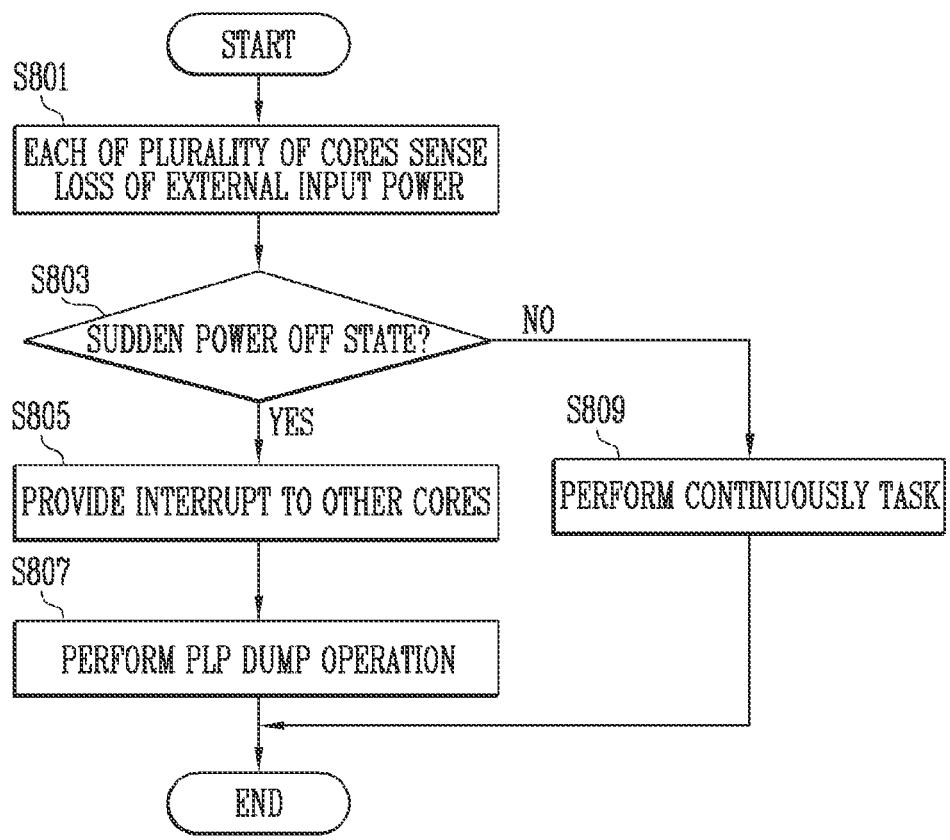
FIG. 8 is a flowchart illustrating a method of operating a memory controller according to an embodiment of the present disclosure.

FIG. 8 is a flowchart illustrating a method of operating a memory controller according to an embodiment of the present disclosure.

Referring to FIG. 8, in operation S801, each of the plurality of cores may sense whether a loss of external input power exists based on the input power signal SIG_P. The power signal SIG_P may be a signal output in a high state when the external input power is equal to or greater than the reference value. In addition, the power signal SIG_P may be a signal output in a low state when the external input power is less than the reference value. When the power signal SIG_P of the low state is input, the plurality of cores may determine that the external input power is less than the reference value.

In operation S803, the plurality of cores may determine occurrence of a sudden power off based on the input power signal SIG_P of the low state. The plurality of cores may determine occurrence of the sudden power off based on a time when the power signal SIG_P of the low state is input.

That is, when the power signal SIG_P of the low state is input during the reference time, the plurality of cores may determine that a memory system is in the sudden power off state. Conversely, when the power signal SIG_P of the low state is input for less than the reference time, the plurality of cores may determine that the memory system is not in the sudden power off state.

In operation S805, among the plural cores, the core that determines the occurrence of the sudden power off in response to the power signal SIG_P of the low state may provide the interrupt signal to other cores. The interrupt signal may be a signal for performing the dump operation.

In operation S807, in a case where the memory system is in the sudden power off state, the core that determines the occurrence of the sudden power off may perform the PLP dump operation. The PLP dump operation may be an operation of storing, in the nonvolatile memory area, the data stored in the volatile memory area. In addition, the remaining cores that receive the interrupt signal from the core that determines the occurrence of the sudden power off may also stop the task which is being performed and perform the PLP dump operation. In this case, the areas inside the nonvolatile memory area controlled by the respective cores may be independent of each other. That is, the plurality of cores may store, in different areas within the nonvolatile memory area, the data stored in the volatile memory. In addition, the PLP dump operation performed by the plurality of cores may be simultaneously performed.

In operation S809, in a case where the memory system is not in the sudden power off state, the core determining it is not in the sudden power off state may not provide a separate interrupt signal to the other cores. Therefore, the cores that do not sense the sudden power off may continuously perform the task which is being performed.

Figure 9:
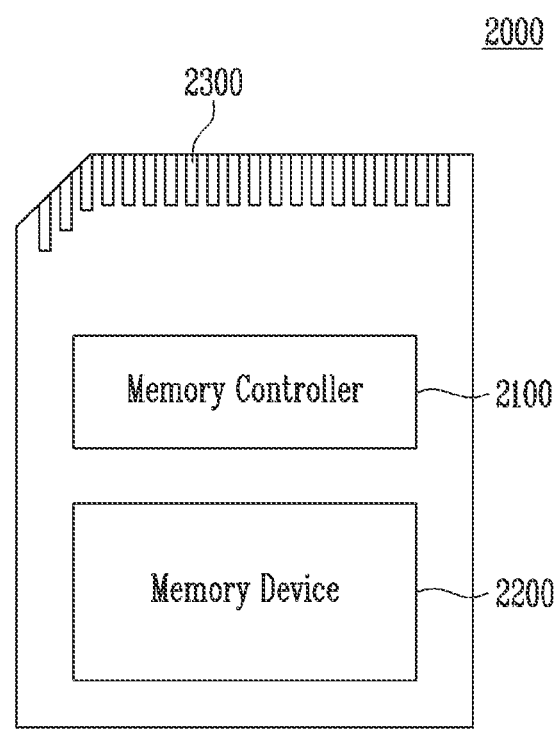
FIG. 9 is a diagram illustrating a memory card system to which a storage device according to an embodiment of the present disclosure is applied.

FIG. 9 is a diagram illustrating a memory card system to which a storage device according to an embodiment of the present disclosure is applied.

Referring to FIG. 9, the memory card system 2000 includes a memory controller 2100, a memory device 2200, and a connector 2300. The memory controller 2100 may be implemented identically to the memory controller 1100 described with reference to FIG. 1.

For example, the memory controller 2100 may include components such as a random access memory (RAM), a processor, a host interface, a memory interface, and an ECC.

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 10:
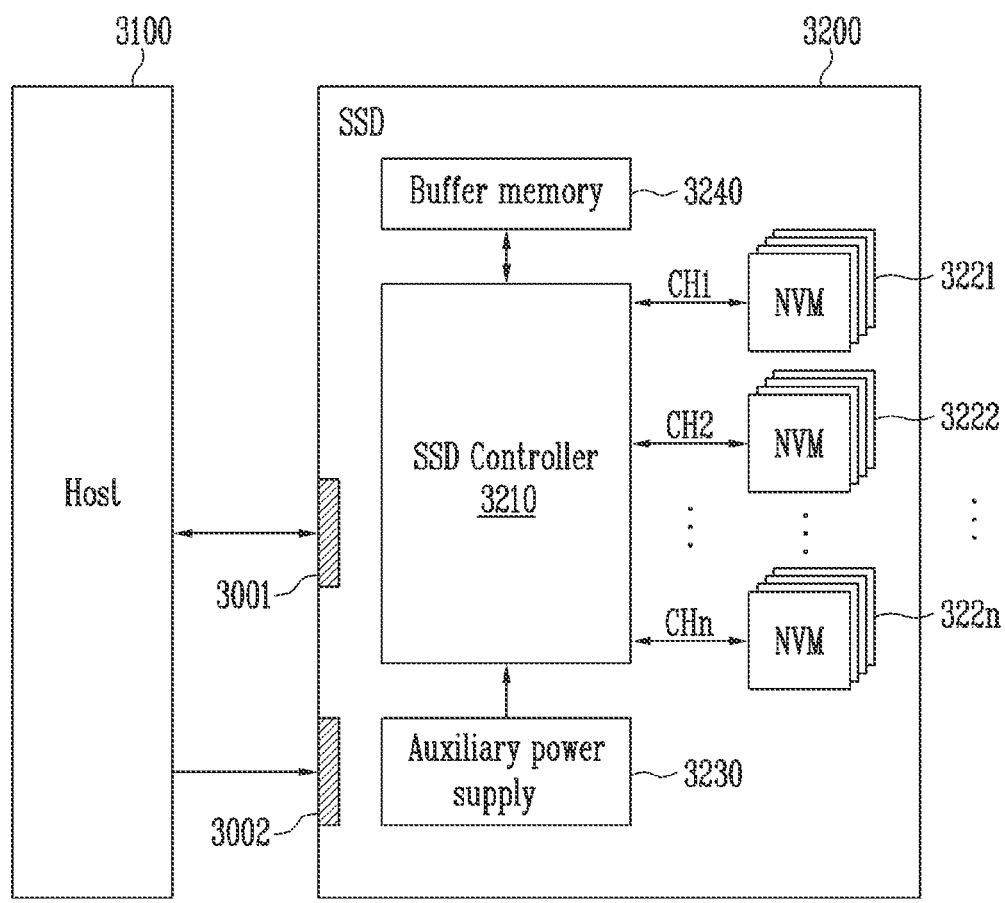
FIG. 10 is a diagram illustrating a solid state drive (SSD) system to which a memory system according to an embodiment of the present disclosure is applied.

FIG. 10 is a diagram illustrating a solid state drive (SSD) system to which a memory system according to an embodiment of the present disclosure is applied.

Referring to FIG. 10, the SSD system 3000 includes a host 3100 and an SSD 3200. The SSD 3200 may exchange a signal with the host 3100 through a signal connector 3001 and receive power through a power connector 3002. The SSD 3200 may include an SSD controller 3210, a plurality of flash memories 3221 to 322n, an auxiliary power device 3230, and a buffer memory 3240.

In an embodiment, the SSD controller 3210 may perform the function of the memory controller 1100 described with reference to FIG. 1.

The SSD controller 3210 may control the plurality of flash memories 3221 to 322n in response to the signal received from the host 3100. For example, the signal may be signals based on an interface between the host 3100 and the SSD 3200.

The auxiliary power device 3230 may be connected to the host 3100 through the power connector 3002. The auxiliary power device 3230 may receive the power from the host 3100 and may charge the power. The auxiliary power device 3230 may provide power to the SSD 3200 when power supply from the host 3100 is not smooth. For example, the auxiliary power device 3230 may be positioned in the SSD 3200 or may be positioned outside the SSD 3200. For example, the auxiliary power device 3230 may be positioned on a main board and may provide auxiliary power to the SSD 3200.

The buffer memory 3240 may operate as a buffer memory of the SSD 3200. For example, the buffer memory 3240 may temporarily store data received from the host 3100 or data received from the plurality of flash memories 3221 to 322n, or may temporarily store meta data (for example, a mapping table) of the flash memories 3221 to 322n. The buffer memory 3240 may include a volatile memory such as a DRAM, an SRAM, an SDRAM, a DDR SDRAM, an LPDDR SDRAM, and a GRAM.

Figure 11:
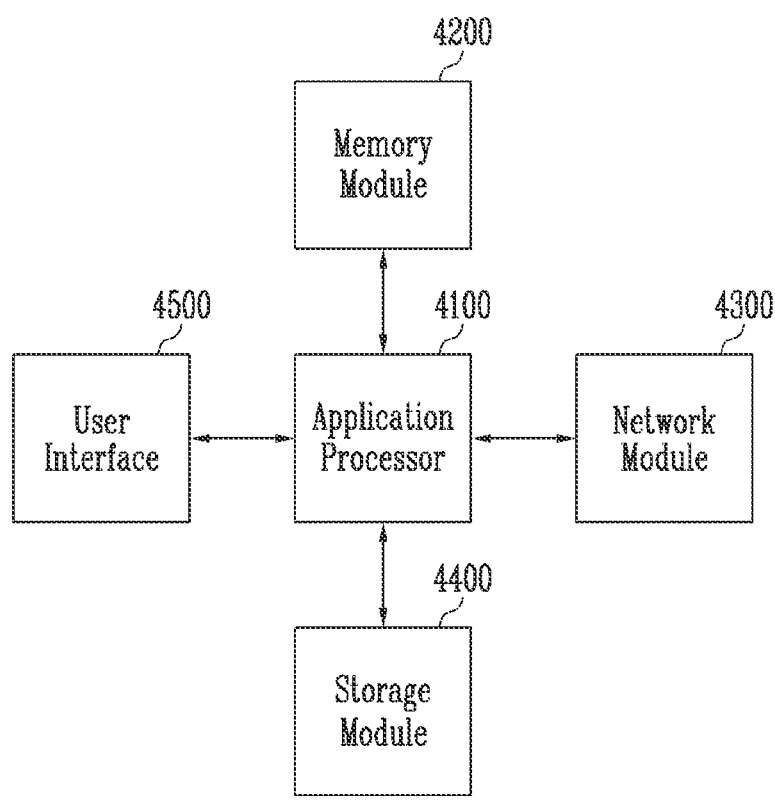
FIG. 11 is a diagram illustrating a user system to which a memory system according to an embodiment of the present disclosure is applied.

FIG. 11 is a diagram illustrating a user system to which a memory system according to an embodiment of the present disclosure is applied.

Referring to FIG. 11, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, or an LPDDR3 SDRAM, or a non-volatile random access memory such as a PRAM, a ReRAM, an MRAM, or an FRAM. For example, the application processor 4100 and the memory module 4200 may be packaged based on a package on package (POP) and provided as a single semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the nonvolatile memory 1300 described in the description of FIG. 1. The storage module 4400 may operate identically to the memory system 1000 described in the description of FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

It should be noted that although the technical spirit of this disclosure has been described in connection with embodiments thereof, this is merely for description purposes and should not be interpreted as limiting. It should be appreciated by one of ordinary skill in the art that various changes may be made thereto without departing from the technical spirit of this disclosure and the following claims. Furthermore, the embodiments may be combined to form additional embodiments.

What is claimed is:

1. A memory system comprising:
a nonvolatile memory area;
a buffer memory area temporarily storing data; and
a plurality of cores configured to store, in the nonvolatile memory area, the data stored in the buffer memory area in response to an interrupt signal,
wherein each of the plurality of cores outputs the interrupt signal indicating that a sudden power off is sensed to remaining cores.

2. The memory system of claim 1, further comprising a power sensor configured to output a power signal of a first state to the plurality of cores when external power is less than a reference value.

3. The memory system of claim 2, wherein the plurality of cores are further configured to determine that the sudden power off is valid when the power signal of the first state is input during a reference time or longer.

4. The memory system of claim 2, wherein the plurality of cores is further configured to determine that the sudden power off is invalid when the power signal of the first state is input during a time less than a reference time.

5. The memory system of claim 1,
wherein the plurality of cores store the data in response to the interrupt signal output by one of the plurality of cores, and
wherein the plurality of cores store, in the nonvolatile memory area, the data stored in the buffer memory area when a task which is being performed is completed.

6. The memory system of claim 1, wherein the buffer memory area includes an SRAM or a DRAM.

7. The memory system of claim 5, wherein the plurality of cores store, in respective memory blocks included in the nonvolatile memory area, the data stored in the buffer memory area.

8. The memory system of claim 1, wherein the data stored in the buffer memory area includes mapping data, host related data, and firmware related data.

9. A memory controller comprising:
a power sensor configured to sense a change of external power and provide a power signal of a first state to a processor when the external power is less than a reference value; and
the processor including a plurality of cores,
wherein each of the plurality of cores:
independently performs a task according to a priority,
provides information on occurrence of a sudden power off to remaining cores, and
performs a dump operation of storing system data in a nonvolatile memory area in response to the sudden power off or the information from the remaining cores.

10. The memory controller of claim 9, wherein each of the plurality of cores comprises:
a signal controller configured to receive the power signal of the first state from the power sensor and provide the information on occurrence of the sudden power off to the remaining cores;
a sudden power off sensor configured to determine the occurrence of the sudden power off when the power signal of the first state input from the signal controller is input during a reference time or longer; and
an operation controller configured to perform a task.

11. The memory controller of claim 10, wherein the signal controller does not receive the power signal of the first state when the operation controller is performing a task having a priority higher than that of an operation of determining the sudden power off.

12. The memory controller of claim 10, wherein the operation controller included in each of the plurality of cores is further configured to control a corresponding memory area among memory areas included in a memory device.

13. The memory controller of claim 10, wherein the information on the occurrence of the sudden power off includes an interrupt signal commanding the remaining cores to perform the dump operation.

14. The memory controller of claim 9, wherein the dump operation is an operation of controlling a memory device to store the system data stored in a buffer memory in the nonvolatile memory area.

15. The memory controller of claim 10, wherein:
the signal controller of a core sensing the sudden power off provides, to the signal controllers of the remaining cores, the information on the occurrence of the sudden power off,
the operation controller of the core sensing the sudden power off is further configured to perform the dump operation, and
the operation controller of each of the remaining cores is further configured to perform the dump operation in response to the information provided to a corresponding signal controller of the signal controllers of the remaining cores.

16. The memory controller of claim 15, wherein the dump operation is a task having a priority higher than that of a task of which continuity is not required to be guaranteed.

17. A memory system comprising:
a plurality of nonvolatile memory areas;
a volatile memory area configured to store system data; and
a plurality of cores configured to store data in the plurality of nonvolatile memory areas, respectively,
wherein a core failed to sense a sudden power off among the plurality of cores is further configured to store the system data in the plurality of nonvolatile memory areas in response to a sudden power off sensed by one of the plurality of cores.

18. A controller comprising first and second devices configured to independently control operating and storage memories to dump respective first and second data from the operating memory into the storage memory, wherein:
the first device is further configured to generate a signal upon detecting a sudden power interrupt, and
the second device controls, in response to the signal, the operating and storage memories to dump the second data from the operating memory into the storage memory.

* * * * *